United States Patent Office 3,661,894
Patented May 9, 1972

3,661,894
METHOD OF PRODUCING N-ALKYL LACTAMS
Klaus Wehner, Leuna, Werner Kisan, Halle-Neustadt, and Gerald Kunz, Merseburg-West, Germany, assignors to Veb Leuna-Werke "Walter Ulbricht," Leuna, Germany
No Drawing. Filed June 29, 1970, Ser. No. 51,002
Int. Cl. C07d 41/06
U.S. Cl. 260—239.3                                  8 Claims

ABSTRACT OF THE DISCLOSURE

Method of producing a N-alkyl substituted lactam, comprising contacting a N-unsubstituted lactam with a symmetrical dialkyl ether at a temperature of 200 to 400° C. in the presence of a catalyst which catalyzes the splitting off of water.

---

This invention relates to a method for producing N-alkyl substituted lactams, especially N-methyl lactam, by the alkylation of the corresponding unsubstituted lactam.

It is known to produce N-alkylated lactams by reaction of lactones with primary amines (West German Auslegeschrift 1,265,159). This procedure is expensive since the lactone must be obtained by a special method of synthesis requiring many steps. Furthermore, a high yield is not obtained.

It is also known to produce N-alkyl lactams by reacting alkyl halides with metal salts of the lactams (J. Tafel and D. Wassmuth; Ber. Dtsch. Chem. Ges. 40, 2839 (1907)). Specifically, for the production of N-methyl lactams the reaction of unsubstituted lactams with dimethyl sulfate has been described (E. Spaeth and H. Bretschneider; Ber. Dtsch. Chem. Ges. 61, 330 (1928)). These methods require the use of large quantities of solvents as well as a lengthy and complicated working up of the reaction mixture. It has also been proposed to produce N-alkyl lactams by gas phase reaction of unsubstituted lactams with alcohols in the presence of catalysts which catalyze the splitting off of water and at temperatures of about 300° C., as an example of which is given the reaction of pyrrolidone-2 with methanol which yields N-methyl pyrrolidone-2 (U.S. Pat. No. 2,674,602). Here, too, the yield is quite low (Table 1, below).

It is an object of this invention to produce N-alkyl lactams in higher yields and in a simple way.

More particularly, it is an object of this invention to provide a commercially applicable method of synthesizing N-alkylated lactams based on easily obtainable starting materials, involving an uncomplicated reaction procedure and working up of the reaction mixture and giving good yields.

According to the invention, a N-substituted lactam is produced by alkylation of a corresponding N-unsubstituted lactam by reaction of the unsubstituted lactam with a symmetrical dialkyl ether in the presence of a catalyst which catalyzes the splitting off of water and at temperatures between 200 and 400° C. Preferably, the lactam employed as a starting material is N-unsubstituted lactam having 4 to 8 carbon atoms in the ring. The preferred alkylating agents according to the invention are symmetrical dialkyl ethers in which each alkyl group contains 1 to 4 carbon atoms. The molar ratio of the alkylating agent to the lactam is 0.5–10 mol:1 mol, preferably 1–5 mol:1 mol.

Catalysts suitable for the method of the invention are, for example, bauxite, silicates, phosphates, sulfates, and, preferably, aluminum oxide, which, if desired, can be carried on conventional carriers or modified by conventional additives.

As silicates may be mentioned such as those of alkaline earth metals and aluminum, for instance, naturally occurring silicates such as montmorillonite, kaolin, and bentonite. Suitable phosphates are those of alkaline metals, alkali earth metals, zinc, and aluminum, for example $AlPO_4$. Suitable sulfates are those of magnesium, zinc, and aluminum, for instance magnesium sulfate. As carriers may be mentioned aluminum oxide, active carbon, and kieselguhr. Furthermore, any acid substance may be used as an additive, preferably to alumina.

The range of the catalyst capacity, expressed as the weight of product per gram of catalyst per hour, lies between 0.01 and 1.0 g., preferably between 0.05 and 0.5 g.

In the case of methylation the method of the invention is carried out by simultaneously feeding the lactam in liquid form and the dimethyl ether in vapor form into the reactor after having passed over a preheated. In the reactor the reaction takes place over a stationary bed of the catalyst. The reaction product which leaves the reactor is condensed and finally distillatively decomposed in a known way. Any unreacted dimethyl ether can by recycled. Likewise, unconverted lactam recovered by distillation can be recycled.

The N-alkylated lactams prepared according to the invention have many uses, for example as selective solvents or as intermediate products for syntheses.

The advantages of the method according to the invention, especially the method of methylating lactams by the use of dimethyl ether, in comparison to the known method of alkylating with methanol are that with a single throughput a higher yield of the alkylated lactam is obtained simultaneously with a greater catalyst capacity (weight of product per unit weight of catalyst and per unit time) and a large reduction in cost. This is illustrated in the following table (Table 1) which gives a comparison of the methylation of $\epsilon$-caprolactam by the use of methanol on the one hand and the use of dimethyl ether on the other hand by means of a single throughput in the same apparatus in both cases and with the use of aluminum oxide as the catalyst in both cases. The molar ratio of the alkylating agent to the lactam is 2:1.

Table I

| Catalyst capacity (g. $\epsilon$-caprolactam per g. catalyst, per hour) | Temperature (° C.) | Conversion of $\epsilon$-caprolactam to N-methyl-$\epsilon$-caprolactam | |
|---|---|---|---|
| | | Alkylation with methanol, percent | Alkylation with dimethylether, percent |
| 0.1 | 300 | 50.6 | 70.8 |
| 0.2 | 300 | 44.5 | 63.5 |
| | 320 | 47.7 | 77.2 |
| 0.3 | 300 | 43.5 | 52.3 |
| | 320 | 46.4 | 72.1 |

Results similarly favorable to those obtained by the methylation of $\epsilon$-caprolactam with dimethyl ether are obtained by the methylation of pyrrolidone-2 with dimethyl ether. Also, by the use of higher symmetrical dialkyl ethers, for example diethyl-, diisopropyl-, dibutyl and diisobutyl ether, the corresponding alkylated products are obtained in good yields.

A further advantage of the method of the invention, especially the method of producing N-methyl-$\epsilon$-caprolactam, is that the starting materials are readily and in large quantities commercially available. Dimethyl ether is very inexpensive, since it is a generally undesired but necessary by-product of methanol synthesis which for want of numerous chemical uses is often used as a heating vapor. $\epsilon$-Caprolactam is widely commercially produced. Since a high purity requirement is not necessary for $\epsilon$-caprolactam employed in the method of the invention, lower quality $\epsilon$-caprolactam fractions may be employed if desired.

The invention will now be further described by reference to the following examples:

EXAMPLE 1

(Production of N-methyl-ε-caprolactam)

From a heated reservoir to a laboratory reactor is metered 1200 g. of ε-caprolactam over a period of 7.5 hours. The laboratory reactor consists of a reaction tube heated to 320° C. and containing 800 g. of aluminum oxide as a catalyst. Simultaneously into the reaction tube is fed 64 liters per hour of dimethyl ether. During the reaction period a very weak stream of nitrogen is passed through the apparatus. The product mixture which leaves the reactor is condensed by cooling and subjected to distillation. After a distilling off of the low boiling components consisting mainly of methanol and water, raw N-methyl-ε-caprolactam distills off at 105 to 115° C. at 10 mm. Hg pressure in a quantity of 1061 g. As the high boiling fraction there is recovered at boiling temperature of 138 to 140° C. at 10 mm. Hg pressure ε-caprolactam in a quantity of 196 g. (16.3% based on the ε-caprolactam initially charged). This recovered caprolactam may be employed for reaction with dimethyl ether to obtain more N-methyl-ε-caprolactam. Reacting the 196 g. of recovered ε-caprolactam in the same manner, 176 g. of additional raw N-methyl-ε-caprolactam is obtained and only 32 g. of unreacted ε-caprolactam remains. The 1237 g. of raw N-methyl-ε-caprolactam thus obtained by two throughputs is subjected to further distillation whereby 1212 g. (98% of the weight quantity charged) of a product is recovered which by gas chromatography as indicated to be 99.5% pure N-methyl-ε-caprolactam (boiling point at 10 mm. Hg pressure—105 to 106° C.; $N_D^{25}$—1.4810; $D_4^{25}$—1.012). The conversion of ε-caprolactam to N-methyl-ε-caprolactam, calculated from the amount of N-methyl-ε-caprolactam of greater than 99.5% purity obtained by the further distillation, is 77.2% for one throughput and 89.9% for two throughputs.

EXAMPLE 2

(Production of N-methyl pyrrolidone-2)

Employing the apparatus of Example 1 but at a reaction temperature of 300° C. there is fed thereto 901 g. of pyrrolidone-2 at a rate of 120 g. per hour together with 64 liters per hours of dimethyl ether. From the reaction product obtained the raw N-methyl-pyrrolidone-2 is separated by distillation. This raw N-methyl-pyrrolidone-2 is then subjected to a further distillation whereby there is obtained as determined by gas chromatography 99.7% pure N-methyl pyrrolidone-2 (boiling point at 10 mm. Hg pressure—80° C.; $N_D^{20}$—1.4702; $D_4^{20}$—1.029). The quantity of essentially pure N-methyl pyrrolidone-2 thus obtained is 816 g. which corresponds to a yield of 77.7% 161 g. (17.9%) of unconverted pyrrolidone-2 is recovered, having a boiling point at 10 mm. Hg pressure of 120 to 122° C.

EXAMPLE 3

(Production of N-ethyl-ε-caprolactam)

The apparatus and reaction temperature of Example 1 are employed. Over a period of 7.5 hours to the reactor is fed 600 g. of ε-caprolactam and 785 g. of diethyl ether. The raw N-ethyl-ε-caprolactam is separated from the reaction product by distillation. By a further distillation of the raw N-ethyl-ε-caprolactam there is obtained as determined by gas chromatography 497 g. of greater than 99% purity N-ethyl-ε-caprolactam (boiling point at 15 mm. Hg pressure—123 to 124° C.; $N_D^{25}$—1.4775; $D_4^{25}$—0.981) which corresponds to a yield of 66.0%. Also recovered is 157 g. (26.2%) of unconverted ε-caprolactam which may be fed back to the reactor for further conversion to N-ethyl-ε-caprolactam.

EXAMPLE 4

(Production of N-(n-butyl)-ε-caprolactam)

The apparatus of Example 1 is employed but at a reaction temperature of 330° C. Over a period of 7.5 hours to the reactor is fed a total quantity of 600 g. of ε-caprolactam together with 1380 g. of di-n-butyl ether. From the raw N-(n-butyl)-εcaprolactam, obtained by fractional distillation of the reaction mixture, the ε-caprolactam being present in small quantities as contaminating substance was separated off by extraction with water. By a further distillation 415 g. of pure N-(n-butyl)-ε-caprolactam is obtained (boiling point at 15 mm. Hg pressure—134–136° C.; $n_D^{25}$—1.4752; $D_4^{25}$—0.962; the purity determined by gas chromatography—99.2%). This corresponds to a yield of 46.2%. 255 g. (42.4%) of unconverted ε-caprolactam is recovered.

EXAMPLES 5–12

(Production of N-methyl-ε-caprolactam)

Employing the apparatus of Example 1 but varying the catalysts as well as the reaction conditions (i.e. temperature; catalysts capacity; mol ratio of the alkylating agent to the lactam) a series of further runs in the reaction of ε-caprolactam with dimethyl ether was carried through. The results are summarized in Table 2.

TABLE 2

| Example No. | Catalyst | Temperature (° C.) | Catalyst capacity (g. ε-caprolactam per g. catalyst, per hour) | Mol ratio of dimethyl ether to ε-caprolactam | Conversion to N-methyl-ε-caprolactam, percent |
|---|---|---|---|---|---|
| 5 | $\eta$-Al$_2$O$_3$ containing flurine as additive | 270 | 0.05 | 4:1 | 51.2 |
| 6 | Montmorillonite | 290 | 0.15 | 3:1 | 59.5 |
| 7 | Sodium phosphate on Al$_2$O$_3$ as carrier | 350 | 0.5 | 2:1 | 54.1 |
| 8 | Calcium phosphate on Al$_2$O$_3$ as carrier | 330 | 0.3 | 1.5:1 | 56.0 |
| 9 | Aluminum phosphate on active carbon as carrier | 310 | 0.2 | 1:1 | 46.6 |
| 10 | Aluminum sulfate on kieselguhr as carrier | 300 | 0.1 | 0.5:1 | 40.7 |
| 11 | Magnesium sulfate on Al$_2$O$_3$ as carrier | 280 | 0.07 | 8:1 | 60.5 |
| 12 | Zinc sulfate on Al$_2$O$_3$ as carrier | 340 | 0.4 | 2:1 | 57.9 |

EXAMPLE 13

(Use of N-methyl-ε-caprolactam as a selective solvent)

A mixture of hydrocarbons, of boiling range 60–95° C., consisting of 58.7% of benzene, 4.1% of toluene and 37.2% of paraffinic and naphthenic non-aromatics, was extracted with a solvent mixture of 70% by volume of N-methyl-ε-caprolactam and 30% of water, in an extraction column of conventional design. The hydrocarbon mixture was fed at about the middle of the column, while the solvent mixture in a volume four times the volume of the hydrocarbon mixture, was fed into the upper part of the column. The solvent passed through the column countercurrently to the hydrocarbons and the concentration of aromatics in the solvent became progressively greater. Provision was made for recycling the aromatic fraction at a point a little above the outlet for the extract phase. The fraction recycled was a mixture of benzene and toluene and was free of non-aromatics. The amount was about the same as the mixture originally introduced.

The solvent, which contained aromatics, was led into a stripper column, in which all the aromatics were distilled off from N-methyl-ε-caprolactam together with a part of water. The mixture of aromatics and water which condensed on cooling, was separated in a separator. The mixture of aromatics, of purity above 99%, partly was fractionated by distillation into benzene and toluene and was partly recycled in the extractor. The solvent, freed from the aromatics, was restored to its original composition by the addition of water and passed again in the extraction column for further use. The non-aromatic fraction, freed from the aromatics, was drawn off as the overhead and constituted the raffinate. The raffinate contained only 2% of aromatics and a small amount of solvent, about 1%. After washing countercurrently with water, in a small extraction column, the N-methyl-ε-caprolactam was removed and was added again to the solvent in the extraction column.

What is claimed is:

1. Method of producing a N-alkyl substituted lactam, comprising contacting a N-unsubstituted lactam with a symmetrical dialkyl ether at a temperature of 200 to 400° C. in the presence of a catalyst selected from the group consisting of bauxite, silicates, phosphates and sulfates, said N-unsubstituted lactam containing 4 to 8 carbon atoms in the ring, each alkyl group of said symmetrical dialkyl ether containing 1 to 4 carbon atoms, and the molar ratio of said symmetrical dialkyl ether to said N-unsubstituted lactam being 0.5–10 mol to 1 mol.

2. Method according to claim 1, wherein the bauxite is $Al_2O_3$.

3. Method according to claim 1, wherein the silicate is a substance selected from the group consisting of montmorillonite, kaolin, bentonite, aluminum silicate, magnesium silicate, and calcium silicate.

4. Method according to claim 1, wherein the phosphate is a substance selected from the group consisting of $AlPO_4$, zinc phosphate, sodium phosphate, potassium phosphate, magnesium phosphate, and calcium phosphate.

5. Method according to claim 1, wherein the catalyst is a substance selected from the group consisting of $MgSO_4$, zinc sulfate, and aluminum sulfate.

6. Method according to claim 1, in which the catalyst is on $Al_2O_3$ as a carrier.

7. Method according to claim 6, in which the carrier contains an acid substance.

8. Method according to claim 1, in which the molar ratio of said symmetrical dialkyl ether to said N-unsubstituted lactam is 1–5 mol to 1 mol.

References Cited
UNITED STATES PATENTS 2,674,602    4/1954    Schuster _____ 260—326.5 FN HENRY R. JILES, Primary Examiner R. T. BOND, Assistant Examiner U.S. Cl. X.R.

260—239.3 A, 293.86, 326.5 FN